C. L. BASTIAN.
SPEEDOMETER.
APPLICATION FILED SEPT. 27, 1909.

995,653.

Patented June 20, 1911.

Witnesses
R. A. White
M. A. Kiddie

Inventor
Charles L. Bastian
By Lithicum, Belt & Fuller
Attys

UNITED STATES PATENT OFFICE.

CHARLES L. BASTIAN, OF CHICAGO, ILLINOIS.

SPEEDOMETER.

995,653.   Specification of Letters Patent.   Patented June 20, 1911.

Application filed September 27, 1909. Serial No. 519,863.

*To all whom it may concern:*

Be it known that I, CHARLES L. BASTIAN, a citizen of the United States, residing at Chicago, in the county of Cook and State of Illinois, have invented new and useful Improvements in Speedometers, of which the following is a specification.

Heretofore it has been common to operate a speedometer through the medium of a flexible shaft geared in a suitable manner to one of the axles of a vehicle, such as an automobile. It has also been common to combine an odometer with the speedometer, both being driven by the same flexible shaft. To operate the speedometer when the vehicle is traveling at a speed of a mile a minute the flexible shaft will revolve at approximately 2500 revolutions per minute. It is customary to operate the odometer mechanism at the rate of one tenth of a revolution for every mile of travel. Hence the flexible shaft is driven at a high rate of speed solely for the purpose of operating the speedometer because the odometer could be operated by the flexible shaft revolving at a very low rate of speed, such as twenty five revolutions per minute.

Considerable trouble has been occasioned in the use of speedometers by reason of the high rate of speed at which the flexible shaft must travel to operate them, and to the fact that this shaft easily gets out of order and the speedometer registers inaccurately.

The object of my invention is to provide for operating the speedometer on a wheeled vehicle in a novel and simple manner and without the use of a flexible shaft. And a further object of the invention is to operate the speedometer electrically by a generator which is connected with a rotating part of the engine of the vehicle.

Figure 1:
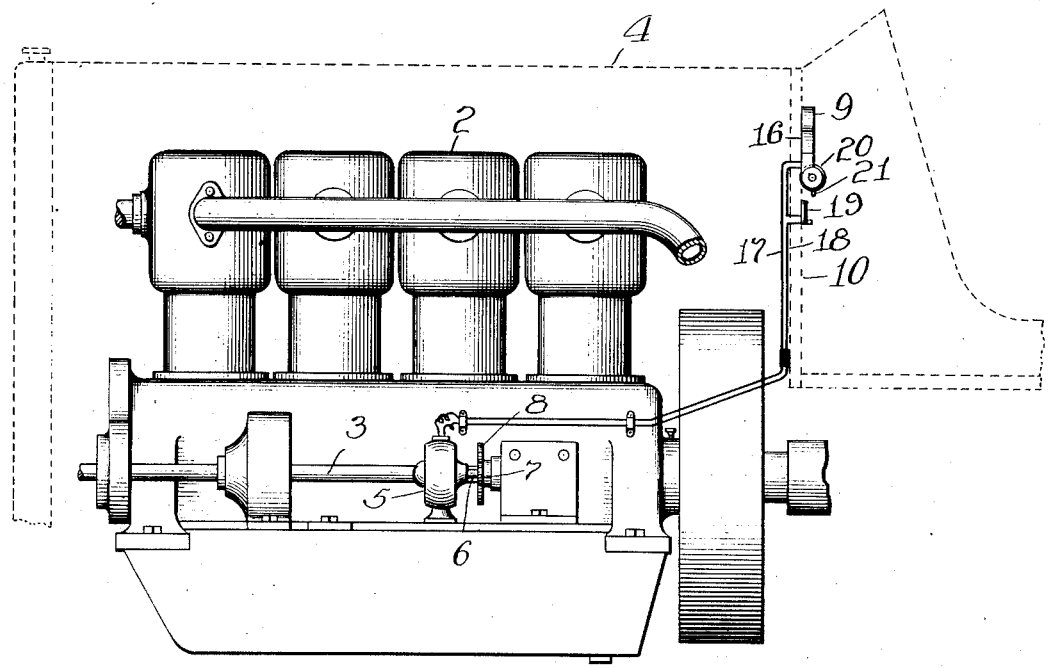
Figure 2:
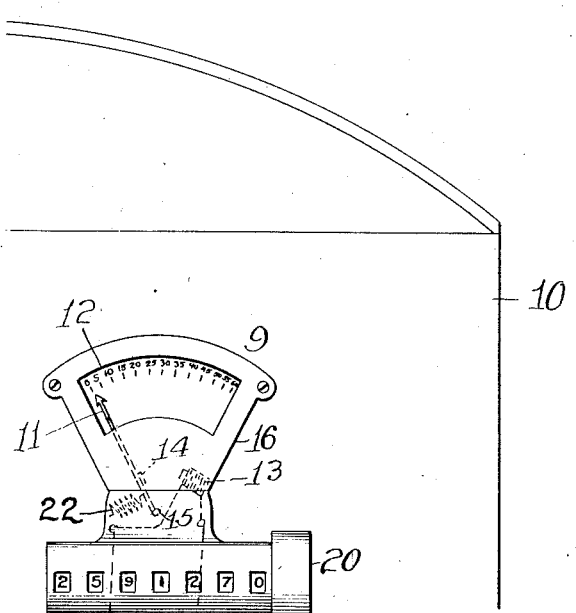

In the accompanying drawings Figure 1 illustrates the engine of an automobile with a portion of the automobile indicated in dotted lines. Fig. 2 shows the speedometer and an odometer on the dash board of the automobile.

Referring to the drawings, 2 designates an engine and 3 a shaft driven therefrom by intermediate gearing.

My invention may be embodied with any engine to which it may be connected and in the drawings I have shown generally and without going into details a common form of engine which is arranged in any suitable manner in an automobile 4 indicated by broken lines in Fig. 1.

A small electric generator 5 is suitably mounted adjacent to the engine and the armature shaft 6 of this generator carries a gear 7 which is driven by a gear 8 on the shaft 3. The speedometer, designated generally 9, is mounted on the dash board 10 of the automobile and it may be constructed in any suitable manner with a pointer 11 and a scale 12 suitably divided and marked to indicate miles. The speedometer may be made in accordance with commercial voltometers and in Fig. 2 I have indicated a simple construction which embodies a magnet coil 13 and an armature 14. The armature is carried by the pointer 11 which is pivotally mounted at 15 in the casing 16 and the magnet coil is likewise mounted in any approved manner in said casing. The generator is connected with the magnet coil 13 by wires 17 and 18. A switch 19 of common construction is interposed in this electric circuit and mounted on the dash board in convenient position for operation.

An odometer, designated generally 20, and of any suitable construction, may be embodied in the casing 16 with the speedometer and this odometer is constructed for operation by a flexible shaft 21 driven from one of the wheels of the vehicle.

By my invention the speedometer indicates the speed of the engine and, consequently, the speed of travel of the vehicle and this is accomplished, as will be readily understood, by operating the generator from the engine shaft to generate a current which operates the pointer. As the speed of revolution of the engine shaft increases a current of greater intensity will be generated and the pointer will be caused to move by the magnet coil to indicate a corresponding speed of travel of the vehicle. It will here be explained that the pointer is prevented from being immediately drawn over against the magnet when the latter is energized, by means of a suitable spring 22 connected to the casing 16 and to the pointer and operating in opposition to the pull of the magnet, the tension of the spring being proportioned to permit of the pointer being moved in accordance with the strength of the pull of the magnet, which in turn is governed by the current furnished by the generator.

While the speedometer and odometer are preferably combined in a single casing for convenience they are operated by entirely different means, the speedometer by an electric current generated by power derived from the engine shaft and the odometer by a flexible shaft driven from a wheel of the vehicle. And as it is not necessary to drive the flexible shaft at as high a rate of speed to operate the odometer as it is to operate the speedometer the wear on the flexible shaft is greatly reduced by my invention and the liability of its getting out of order and operating irregularly and inaccurately is greatly reduced.

My invention is simple in construction and operation and its parts are easy of access to oil or repair. It can be made in various shapes and sizes. It is strong and substantial in construction and it will last much longer and work with a greater degree of accuracy than has been customary heretofore in devices of this kind. The speedometer can be placed on the dash board or any other part of the automobile. The switch can be shifted to break the circuit if it is not desired that the speedometer shall operate and it can be readily shifted to close the circuit whenever it is desired to ascertain the speed of travel of the engine and of the automobile.

What I claim and desire to secure by Letters Patent is:

In a speedometer, an electric generator, means for driving the same from and at a proportional speed to the driving element whose speed is to be indicated, a dial having a scale graduated in miles, a pointer movable over the dial and provided with an armature, an electric circuit including the generator and an electro-magnet, and means for yieldingly opposing the pull of the magnet on the armature, substantially as described.

CHARLES L. BASTIAN.

Witnesses:
WM. O. BELT,
M. A. KIDDIE.